United States Patent
Peronneau et al.

[15] 3,657,475
[45] Apr. 18, 1972

[54] POSITION-INDICATING SYSTEM

[72] Inventors: Georges Peronneau, La Celle Saint Cloud; Henr Poizat, Courbevoie, both of France

[73] Assignee: Thomson-CSF Visualisation et Traitement des Informations T-VT, Paris, France

[22] Filed: Mar. 17, 1970

[21] Appl. No.: 20,369

[30] Foreign Application Priority Data

Mar. 19, 1969 France....................................697845

[52] U.S. Cl................................................178/18, 73/141
[51] Int. Cl...........................................................H04n 1/00
[58] Field of Search....................73/141; 178/18, 19, 20, 21; 324/71 NE

[56] References Cited

UNITED STATES PATENTS 3,156,766  11/1964  Stamps......................................178/18
3,090,226  5/1963   Corti et al..............................73/141 A
3,134,099  5/1964   Woo..........................................178/18

Primary Examiner—Kathleen H. Claffy
Assistant Examiner—Horst F. Brauner
Attorney—Karl F. Ross

[57] ABSTRACT

A position-indicating system, determining the coordinates of a point of a surface to which static force is applied, comprises a rigid plate which is fixed to the surface by means of at least three spaced-apart sensors. These sensors delivering each an output signal which is proportional to its distance from the point of application of the force. These signals are then processed in an electronic unit generating two voltages which represent the coordinates of the point of application of the force to the surface, as measured with reference to two axes determined by the three sensors.

8 Claims, 4 Drawing Figures

Patented April 18, 1972

Georges Peronneau
Henri Poizat
Inventors.

By Karl F. Ross
Attorney

POSITION-INDICATING SYSTEM

The present invention relates to a position-indicating system by which the coordinates of a point on a surface are accurately determined. This system is mainly intended to determine the coordinates of the selected point upon application thereto of a localized static force, specifically pressure, which, when sensed by appropriate means, yields electric voltages proportional to the coordinates of the point of application of such force.

Among the different position-indicating systems known heretofore, those which operate by the application of pressure to the point to be determined generally require a great number of pressure sensors fixedly secured to the surface where the position of a point is to be determined; generally, their positions correspond to predetermined points on said surface. The number of possible positions which can effectively be determined is then limited to the number of sensors the surface is able to carry. Besides, when the device is used, for instance, to spot or indicate a position on the screen of a cathode-ray tube, the information data available from the screen may be altered by the not negligible number of sensors disposed in front of said screen.

The present invention has the object of remedying these drawbacks by providing an indicating system wherein the number of possible positions which can be determined depends not on the number of sensors but only on their dynamic range.

Our invention also aims at providing a system of this type designed to locate a static force applied not to a geometric point but to a small area.

According to the invention, the position-indicating system comprises a rigid plate which is fixed to the surface where points are to be determined by means of sensors, though in some cases it may be convenient that the surface be directly coupled to the sensor means without interposition of a rigid plate.

The application of pressure on a point of said surface causes voltages to appear at the output of the sensors. These voltages are combined in an electronic unit which delivers at its output a pair of voltages proportional to the coordinates of the point of application of the force to the surface.

In the case where the sensors used are of the piezoelectric type, the system according to the invention facilitates a coding of the output signals of the system.

In accordance with another feature of our invention, sensitivity of the system is increased by minimizing or eliminating the influence of the weight of the plate upon the sensors.

The invention will be better understood from the following detailed description of representative embodiments taken in conjunction with the accompanying drawing in which.

Figure 1:
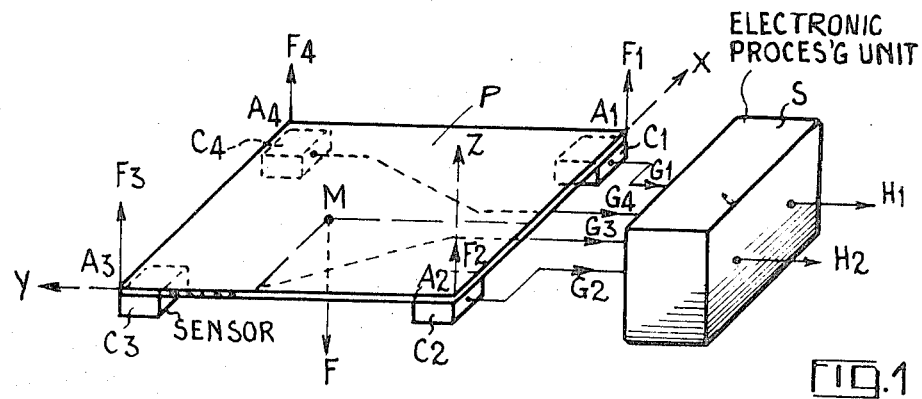
FIG. 1 is a schematic perspective view of a system according to our invention.

In the device illustrated in FIG. 1, four sensors $C_1$, $C_2$, $C_3$ and $C_4$ are disposed at respective corners under a rigid plate P. The base of said sensors is assumed to rest on a rigid reference surface, shown in FIG. 4, toward which the plate P is displaceable. When a pressure force F is applied to a point M on an exposed surface of the plate P, perpendicularly to that surface, the sensors $C_1$, $C_2$, $C_3$, $C_4$ produce in response to said force a set of voltages $G_1$, $G_2$, $G_3$, $G_4$ which are each proportional to the distance between point M and the corresponding sensor. An electronic calculating unit S then processes the signals delivered by the sensors and transforms the incoming voltages in to output voltages $H_1$ and $H_2$ representative of the coordinates of the point M.

In FIG. 1, the plate P is supported at points $A_1$, $A_2$, $A_3$ and $A_4$, point $A_2$ being chosen for instance as the origin of the coordinate system. The forces which are applied to the system are, on the one hand, the pressure F effective at the point M whose coordinates X and Y are to be determined, and on the other hand the forces of reaction at points $A_1$ to $A_4$, designated $F_1$, $F_2$, $F_3$, $F_4$. The determination of the cartesian coordinates X and Y of point M is made by solving the equations of a system expressing that the sum of the moments of the forces is zero, as is the sum of the forces applied to the system.

It is easy to demonstrate that, in a static system in which transit time is not a factor, the abscissa X is proportional to $(F_1 + F_2)/\Sigma F_i$ (1) and the ordinate Y is proportional to $(F_2 + F_3)/\Sigma F_i$ (2), the subscript $i$ denoting any of the subscripts 1–4. These values are independent of the intensity of the pressure F applied to point M, as there is proportionality between the acting force F and the reaction forces $F_1$ to $F_4$. The coordinates of point M can be determined for every position of this point on the plate P, regardless of the shape of the plate which is not necessarily rectangular or square as represented in the drawing. It is also not necessary that the sensors $C_1$ to $C_4$ be placed at the corners of the plate in the case of a rectangle or a square, for instance. If these sensors are not located at the corners of the plate P, the forces of reaction at points outside the perimeter delineated by the sensors are of the opposite sign which enables a determination of the coordinates of these points. Further, if the plate P is uneven, obtained coordinates X and Y correspond to those of the projection of point M onto the plane defined by the sensors, on condition that force F is perpendicular to this plane.

The system shown in FIG. 1 comprises four sensors since this solution appears to present many advantages in the processing and exploitation of the signals delivered by these sensors. However, three sensors are enough for the determination of the position of a point M on the plate P. Likewise, for some applications it may be of interest to use more than four sensors and, in that case, the electronic unit S handling the output signals of these sensors is modified accordingly.

Figure 2:
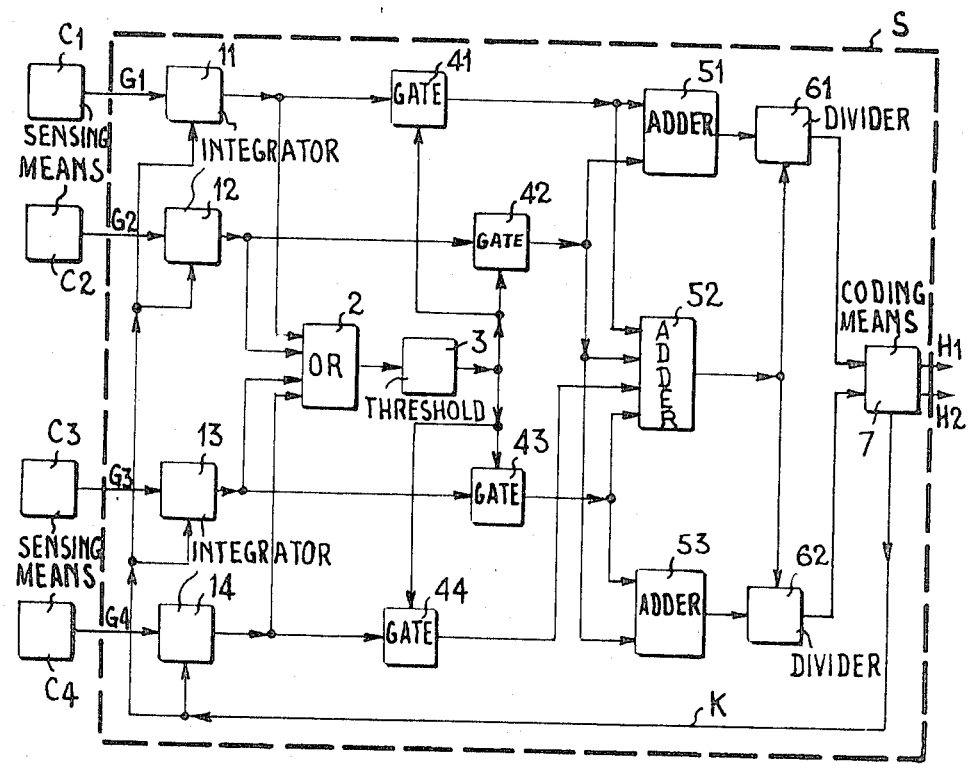
FIG. 2 is a block diagram of the electronic assembly processing the outputs of the sensors in the system of FIG. 2.

FIG. 2 shows a block diagram of such an electronic unit by way of example. This unit is designed to deliver as its outputs the two output voltages $H_1$ and $H_2$, representative of the coordinates X and Y of the point M, in response to the reading signals $G_1$, $G_2$, $G_3$, $G_4$ appearing at its input and issuing from the four sensors $C_1$, $C_2$, $C_3$, $C_4$ of the system, respectively. As already mentioned, the amplitude of these signals $G_1$ to $G_4$ is proportional to the reaction forces $F_1$ to $F_4$. As indicated by the expressions (1) and (2) above, which establish the proportionality between the coordinates of point M and the reaction forces, the determination of the voltages $H_1$ and $H_2$ requires for the summing of $G_1$ and $G_2$, of $G_2$ and $G_3$ and also of the four signals $G_1$, $G_2$, $G_3$, $G_4$, and then the division of the two first sums by the last one. For this purpose, the electronic unit comprises adding circuits 51, 52 and 53 receiving the signals $G_1$, $G_2$, $G_3$, $G_4$, issuing from the sensors $C_1$, $C_2$, $C_3$, $C_4$, respectively, after being integrated in integrating circuits 11, 12, 13 and 14. The respective outputs of adders 51, 52 and 53 lead to dividers 61, 62, connected in turn to a coding circuit 7 delivering the required signals $H_1$, $H_2$ which are to be applied to a computer together with a signal K indicating the end of the coding and hence resetting the integrators 11, 12, 13 and 14.

For each point of plate P, there is obtained a set of two voltages $H_1$, $H_2$ representative of the coordinates X and Y of said point, the value of said voltages being independent of the magnitude of the pressure P applied to such point.

To avoid errors which might be due to fortuitous vibrations of small amplitude of the plate P, a threshold device 3 is advantageously incorporated in unit S. To this end, the output of integrators 11, 12, 13 and 14 is simultaneously applied to the inputs of an OR gate 2 connected to the threshold device 3 and to the inputs of corresponding analogue gates 41, 42, 43, 44 whose outputs are connected to the summing circuits 51, 52, 53. The opening of these analogue gates 41, 42, 43 and 44 is controlled by the output signal of threshold device 3. Hence, for a determination of voltages $H_1$, $H_2$ to occur, it is necessary and also sufficient that at least one of the signals $G_1$ to $G_4$ issuing from the sensors $C_1$ to $C_4$ be higher than the threshold established by device 3.

The electronic unit S which as been disclosed in analogue form can be designed also in digital form. In that case, analogue digital converters are provided at the outputs of integrators 11 to 14. The signals $H_1$, $H_2$ can be then directly applied to a digital computer.

As said before, the sensors used are advantageously of the piezoelectric type. However, the invention encompasses the use of sensors of any other type. For instance, extensometric sensors can be considered in the case where the plate P is suspended from its support by means of said sensors.

In the preceding description, it has been supposed that the applied force F was punctiform, but this is generally not the case. The force may be applied to a zone comprising several points. This case occurs for instance if the pressure is that of a finger pointing out a particular location on the plate P. The voltages $H_1$, $H_2$ obtained at the output of the unit S correspond to the coordinates of the barycenter of the points constituting the zone of application of the force represented by the finger.

The performance of the system is then limited by the precision with which the designation is effected, by the dynamic response characteristic of the sensors and by the rigidity of the plate P.

Figure 3:
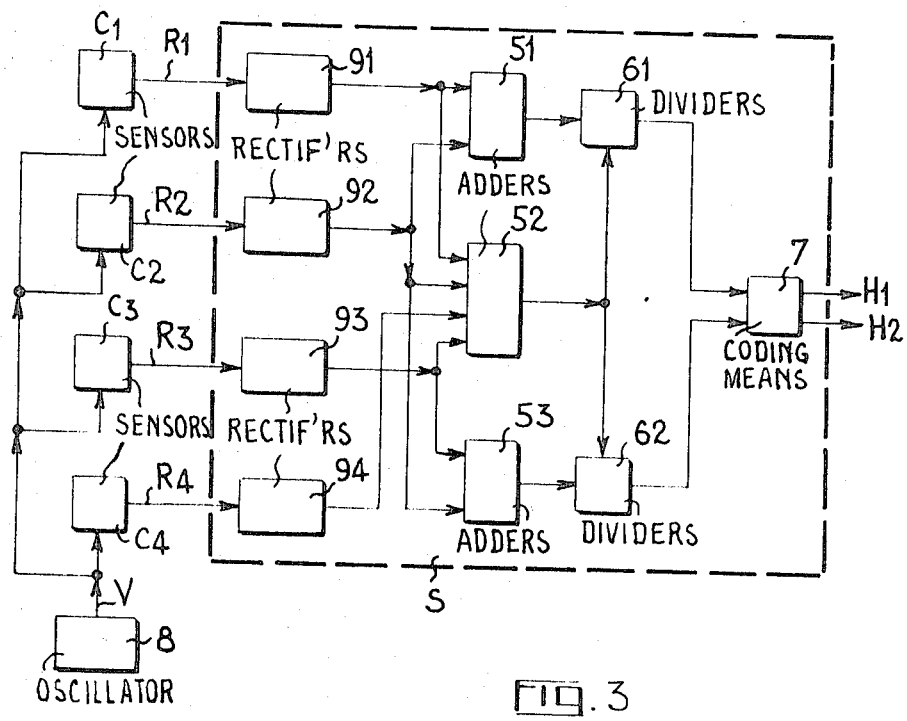
FIG. 3 is a view similar to FIG. 2, showing a modification.

FIG. 3 represents a variant of the diagram of FIG. 2. In that Figure, the sensors $C_1$ to $C_4$ are also of the piezoelectric type. They exhibit a natural resonance frequency and a quality factor Q. Then, if the sensors $C_1$ to $C_4$ are excited at their natural frequency by means of an AC voltage V issuing from an oscillator 8, in the absence of any force acting upon the sensors, there is obtained at the output of said sensors the AC voltage V which is amplified in the ratio Q. As the quality factor Q of a piezoelectric sensor decreases when a pressure is applied to it, the AC voltage then obtained at its output is smaller than that obtained when no pressure is applied. Thus, the application of a static force F to a point M of the plate P, under which the piezoelectric sensors $C_1$ to $C_4$ are disposed, lets the amplitude of the signals $R_1$ to $R_4$ at the outputs of said sensors decrease. This diminution is proportional to the distance between point M and each of the sensors. The AC reading signals $R_1$ to $R_4$ are then applied to a processing unit S wherein they are transformed into DC signals through rectifier elements 91 to 94. Adding circuits 51, 52 and 53 and dividing circuits 61 and 62 combine these different DC signals so as to yield, at the output of the coding circuit 7, output signals $H_1$ and $H_2$ which represent the coordinates of point M of the plate P subjected to the force F. The coding is made easier since the signals fed to the coding circuit are DC signals of indefinite duration.

The signals $R_1$ to $R_4$ from sensors $C_1$ to $C_4$, respectively, are AC signals of a frequency equaling the natural resonance frequency of said sensors. As the frequency of fortuitous spurious vibrations of the plate P is generally different from the natural frequency of the sensors, these spurious vibrations do not effect the signals $R_1$ to $R_4$. Therefore, in the presently described modifications of the system, it is not necessary to provide for a threshold circuit in the processing unit S.

Further, in the absence of any external force applied to plate P, there is always noticeable either a diminution of the output AC signal from the sensors, or the apparition of a signal of small amplitude, according to the nature and the way of utilization of the sensors associated with the plate. This is due to the unavoidable action exerted by the weight of the plate on the sensors $C_1$ to $C_4$, leading to a diminution of the sensitivity of the system.

Figure 4:
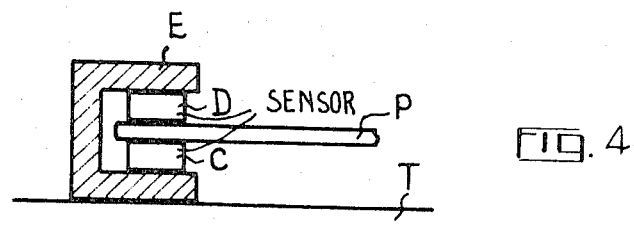
FIG. 4 is a partial sectional view of a coupling assembly between a rigid plate and a set of sensors.

To remedy this drawback, use is made in accordance with the invention of a fastening of the plate P to its supporting surface T as illustrated by the partial sectional view of FIG. 4. As shown there, two identical sensors C and D are fixed on opposite sides of plate P. The assembly constituted by the plate P and two sensors C and D is further squeezed in a support E, for instance a yoke which is attached to the reference surface T. The sensors C and D are serially connected to an input of a calculating unit S identical with the one already disclosed.

By substituting this series mounting of sensors C and D for the single sensors $C_1$ to $C_4$, which were previously shown associated with the plate P, the weight of said plate P is no longer a factor affecting the sensitivity of the system.

Several applications of a system such as just described may be contemplated and will not be mentioned here apart from the combination of the system of the invention with a console for graphical display.

In that case, the sensors $C_1$, $C_2$, $C_3$ and $C_4$ are fixed on the screen of a cathode-ray tube, the plate P being then transparent, e.g., glass. The signals $H_1$ and $H_2$ are transmitted, after coding, to a computer. The operator can then trace curves or designate marks on the screen. The system in accordance with the invention thus dispenses with the use of a light pen or a programmed numerical keyboard, or of any other means enabling the operator to converse with the machine. If the tube is of a sufficiently pressure-resistant type, e.g., as used in television, plate P also can be omitted and, in that case, the sensors can be disposed at the mounting points of said tube, whereupon any pint can be marked by a simple and direct pressure upon the screen of the tube.

Although examplary embodiments of the invention have been disclosed and discussed, it will be understood that other applications of the invention are possible and that the embodiments disclosed may be subjected to various changes, modifications and substitution without thereby departing from the spirit of the invention.

What is claimed is:

1. A system for locating the point of application of static pressure to a receiving surface, comprising:
   a rigid body with an exposed surface subject to the application of localized, perpendicular pressure;
   a plurality of sensors fixedly mounted at spaced-apart points including a first sensor at a first point, a second sensor at a second point and a third sensor at a third point, said first and second points defining a first coordinate axis, said second and third points defining a second coordinate axis, said body being supported exclusively by said sensors, each of said sensors generating a reading signal varying with a respective component of the applied pressure acting upon said exposed surface; and
   calculating means with a first set of input connections to said first and second sensors and with a second set of input connections to said second and third sensors for deriving from the reading signals thereof two output signals proportional to the coordinates of the point of application of said pressure with reference to said axes.

2. A system as defined in claim 1 wherein said calculating means includes first summing means provided with said first set of input connections, second summing means provided with said second set of input connections, third summing means provided with a third set of input connections to all said sensors, first divider means connected to said first and third summing means for deriving therefrom a first output signal proportional to the sum of the magnitudes of the reading signals of said first and second sensors divided by the sum of the magnitudes of all said reading signals, and second divider means connected to said second and third summing means for deriving therefrom a second output signal proportional to the sum of the magnitudes of the reading signals of said second and third sensors divided by the sum of the magnitudes of all said reading signals.

3. A system as defined in claim 2 wherein said sensors include a fourth sensor at a fourth point complementing said first, second and third points to a rectangle.

4. A system as defined in claim 1 wherein said sensors comprise piezoelectric elements.

5. A system as defined in claim 4, further comprising a source of alternating voltage, with an operating frequency corresponding to the natural frequency of said piezoelectric elements, connected to said elements for exciting same into generation of said reading signals with an amplitude varying inversely with the respective pressure components.

6. A system as defined in claim 5, further comprising rectifier means inserted in respective output circuits of said sensors ahead of said calculating means.

7. A system as defined in claim 1 wherein said body is a horizontal plate, each of said sensors comprising a pair of pressure-responsive elements serially connected to said calculating means, said elements bearing upon said plate from opposite sides.

8. A system as defined in claim 1 wherein said calculating means further includes threshold means connected to all said sensors for detecting the magnitudes of said reading signals, and gating means controlled by said threshold means for suppressing said output signals in the absence of a significant reading signal from at least one of said sensors.

* * * * *